United States Patent [19]
Pusch

[11] 3,826,130
[45] July 30, 1974

[54] ELECTRO-MECHANICAL POWER OR PRESSURE MEASURING TRANSFORMER
[75] Inventor: Gunter Pusch, Dilsberg, Germany
[73] Assignee: Industrie-Automation GmbH & Co., Kurpfalzring, Germany
[22] Filed: Sept. 18, 1972
[21] Appl. No.: 290,104

[30] Foreign Application Priority Data
Sept. 16, 1971 Germany............................ 2146339

[52] U.S. Cl. ............... 73/141 A, 73/398 AR, 338/2
[51] Int. Cl. .............................................. G01l 5/00
[58] Field of Search ....... 73/398 C, 398 AR, 398 R, 73/88.5 R, 88.5 SP, 141 A; 338/2, 3, 4, 5, 6

[56] References Cited
UNITED STATES PATENTS
3,031,928 5/1962 Kopito ............................. 73/398 C
3,040,583 6/1962 Post .................................. 73/398 R
3,405,559 10/1968 Moffatt ............................. 73/398 C
3,513,430 5/1970 Heller ............................. 73/398 AR
3,641,812 2/1972 Vick ............................... 73/88.5 SP Primary Examiner—Donald O. Woodiel

[57] ABSTRACT

An electro mechanical power- or pressure-measuring-transformer with a body elastically deformable under the influence of the value to be measured. The deformation of the body is transformed in corresponding electric values, wherein the elastic deformable body comprises non-metallic, inorganic working material constituting a ceramic material.

1 Claim, 1 Drawing Figure

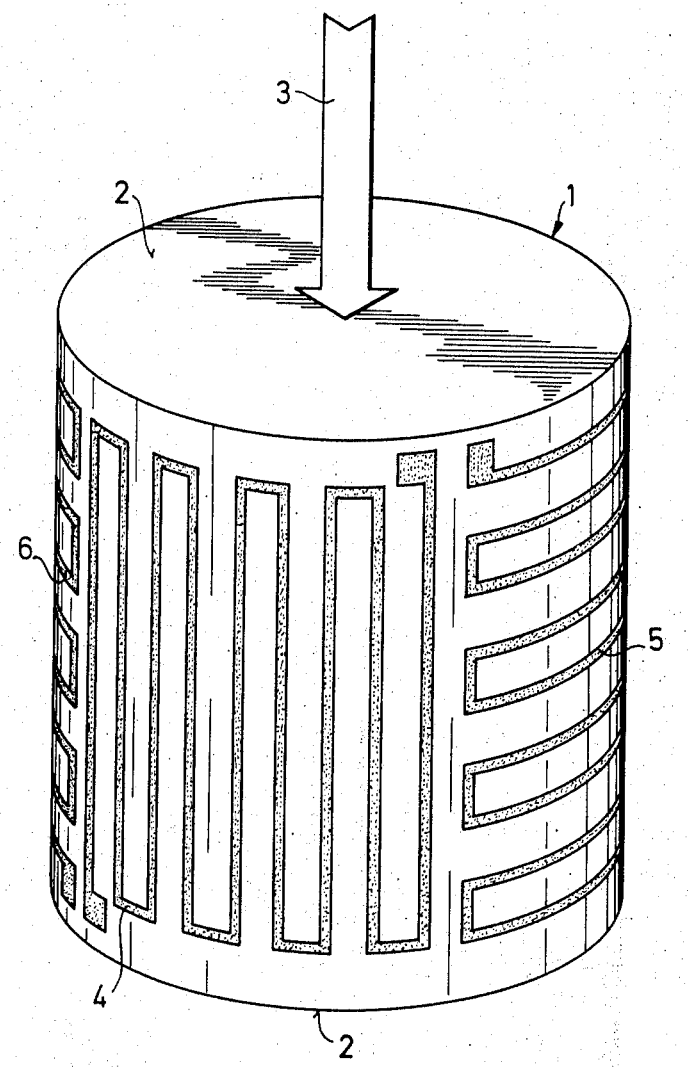

ELECTRO-MECHANICAL POWER OR PRESSURE MEASURING TRANSFORMER

The present invention relates to electro mechanical power- or pressure-measuring-transformers with an elastic deformable body under the influence of the value to be measured, the deforming of which is transformed into corresponding electric values.

Such electro mechanical power- or pressure-measuring transformers are used in electro mechanical scales and pressure measuring devices of all types. They should release electrical values which are as much as possible strongly proportional to the values to be measured.

It is known to produce the elastic deformable bodies of metallic working material and in order to keep low the temperature influence, to use steels, the elasticity module of which is as much as possible independent upon the temperature.

The known power- or pressure-measuring-transformers have the drawback that metallic material produced for these or similar purposes in the area of small elastic deformations do not correspond completely with the Hooke law, that means the proportionality of the deformations of elastic deformable bodies to be desired is not obtained with the load with the known transformers. Of a disadvantage is furthermore, that due to the thermic expansion, temperature influences interfere with the measuring exactness.

It is one object of the present invention to provide an electro mechanical power- or pressure-measuring-transformer, wherein the elastic behavior is improved for electro mechanical power- or pressure-measuring-transformers, in particular in the area of small deformations.

It is another object of the present invention to provide electro mechanical power- or pressure-measuring-transformers, wherein the elastic deformable body comprises a non-metallic, inorganic working material. To the non-metallic, inorganic material belongs ceramic, glass and glass ceramics. They have the advantage that they follow also in the area of smaller and smallest deformations the Hooke law. Furthermore, they have generally a small thermic expansion coefficient. Due to these characteristics, it is possible to exploit small elastical deformations measuring technically, without falsifying the thermic expansion practically the measuring result.

With the above and other objects in view, the present invention will become clearly understood in connection with the drawing in which the only FIGURE illustrates an electro-mechanical power-or pressure-measuring transformer.

Referring now to the drawing, the elastic deformable body of glass ceramic material in accordance with the present invention comprises a cylinder 1, the cover surface 2 of which, the power or force to be measured (indicated by the arrow 3) acts. The deformation brought about by it can then be determined from the changing of the electrical resistance, which resistance 4 is vaporized directly on the cylinder 1, and which resistance can be measured.

Two of the resistances, namely the resistance 4 and the diametric opposite lying (not visible in the sketch) resistance, formed as the resistance 4, essentially is changed by the longitudinal changing of the cylinder, while the resistance 5 and the resistance 6, equally formed lying opposite to the resistance 5, are influenced by changes of the periphery of the cylinder.

It is suitable to choose from the great number of the non-metallic, inorganic working materials to select those for the production of elastic deformable bodies for power- or pressure-measuring-transformers, the elasticity module of which is independent upon the temperature as much as possible and its expansion coefficient of which is small.

Since the working materials being in question permit the economic production of even comparatively complicated forms, the application of these working materials opens the possibility, to use the forms of the known power- or pressure-measuring-transformers of metal and the methods of the reaction of the deformation into corresponding electric values.

As a particular advantageous working material has been proven glass ceramics. Its small expansion coefficient in connection with their favorable elastic characteristics result in an elastically deformable body, which is superior to the known one's. The smaller permissible deformation in relation to metallic bodies of the same dimensions is balanced out by its usability up into the area, in which, in case of metallic working material, the Hooke law is no more fullfilled.

Since the working materials to be used in accordance with the present invention constitute electric insulating materials, during transforming of the deformation in corresponding electric values, different advantages relative to the known result.

They reside in the fact, that electrodes for the transformation of the mechanical transformation can be applied by capacitive sensing directly, by example, by vaporizing on the deformable body.

Also for the transformation of the deformation into electrical values of the type of so-called "expansion measuring strips", the bodies according to the present invention are well suitable. Because they constitute insulators, also the resistances variable by the deformation, can be applied directly on the body, which, by example, can be achieved in known manner by vaporizing.

The meander form, mostly conventional in connection with known expansion measuring strips which serve the obtaining of a higher resistance, can also be obtained during vaporizing. Such formation is superfluous, however, in most cases, because the resistance material can be applied selectively in thin layers.

The advantages reside in the fact, that electrodes can be applied for the wall of the mechanical deformation by capacitative sensing directly, by example, by vaporization onto the deformable body.

Also for the transformation of the deformation into electrical values according to so-called "expansion measuring strips", the bodies according to the present invention, are well suited. Because they constitute insulators, one can also apply the resistances, variable by the deformation directly on the body, which can be done, by example, in known manner by vaporization.

The meander-form mostly conventional in the known expansion measuring strip, which meander form serves the obtaining of a higher resistance, can also be produced during evaporation. Such forming is superfluous however, in most cases, because the resistance material can be applied in very thin layers.

The equalling of the resistances applied on the body on their set point is possible in a simple manner, by example, by polishing, etching or grinding.

The resistances to be applied can be arranged and formed such, that they can serve also as electrode in capacitive determination of the deformation.

This has the advantage, that one and the same body is useable in power- or pressure-measuring-transformers, which operate in accordance with the condensor - or the resistance - method.

An exchangeable use in a power- or pressure-measuring-transformer is possible in such manner, that the equilibrium of the measuring bridge, by means of which the resistance of the electrode of the "expansion measuring strip" is gripped, in accordance with its capacity is displaced against another electrode.

Herein the term "glass-ceramics" is defined in accordance with known definition as follows:

The raw materials used for glass-ceramics are similar to those for conventional glasses but include certain additional constituents known as nucleating agents. After forming one of the usual ways—pressing, blowing, or drawing—the body is reheated to the nucleating range. Here billions of nuclei per cubic centimeter will form and grow to many crystals, even though no obvious crystallization seems to have taken place. The temperature is then raised to a higher degree where the entire glassy body crystallizes around the nucleating crystals. This process continues until the growing crystals encounter others and the entire mass becomes crystal except for small amounts of a glassy matrix at the crystal boundaries. The fabricating, nucleating, and crystallizing temperatures vary with the glass composition. In some nucleation is carried out by exposure to X rays or ultrasonic radiation, followed by heat treatment.

In contrast to conventional ceramics, glass-ceramics are much smaller and more uniform crystals and there are voids. Compared with the base glass, glass ceramics are harder, resist deformation up to higher temperatures and are several times stronger.

While I have disclosed one embodiment of the present invention, it is to be understood that this embodiment is given by example only and not in a limiting sense.

I claim:

1. An electro-mechanical power- or pressure-measuring-transformer comprising a body elastically deformable under the influence of a value to be measured, the deformation of said body being transformed in corresponding electric values, said elastic deformable body comprises non-metallic inorganic working material, and said working material comprises glass-ceramic, and expansion measuring strips, constituting resistances, variable under the influence of the deformation, directly attached to said elastic deformable body.

* * * * *

UNITED STATES PATENT OFFICE
CERTIFICATE OF CORRECTION

Patent No. 3,826,130     Dated July 30, 1974

Inventor(s) Gunter Pusch

It is certified that error appears in the above-identified patent and that said Letters Patent are hereby corrected as shown below:

Item [73] "Kurpfalzring, Germany" should read

-- Heidelberg, Germany --.

Signed and sealed this 11th day of February 1975.

(SEAL)
Attest:

RUTH C. MASON
Attesting Officer

C. MARSHALL DANN
Commissioner of Patents
and Trademarks